July 21, 1964  W. D. MAYNARD  3,142,053
DATA POSTING INDICATOR HAVING PLURAL CONCENTRIC
DISC COMMUTATOR CONTROL
Filed Sept. 26, 1958  5 Sheets-Sheet 1

INVENTOR.
W. D. MAYNARD
BY
HIS ATTORNEY

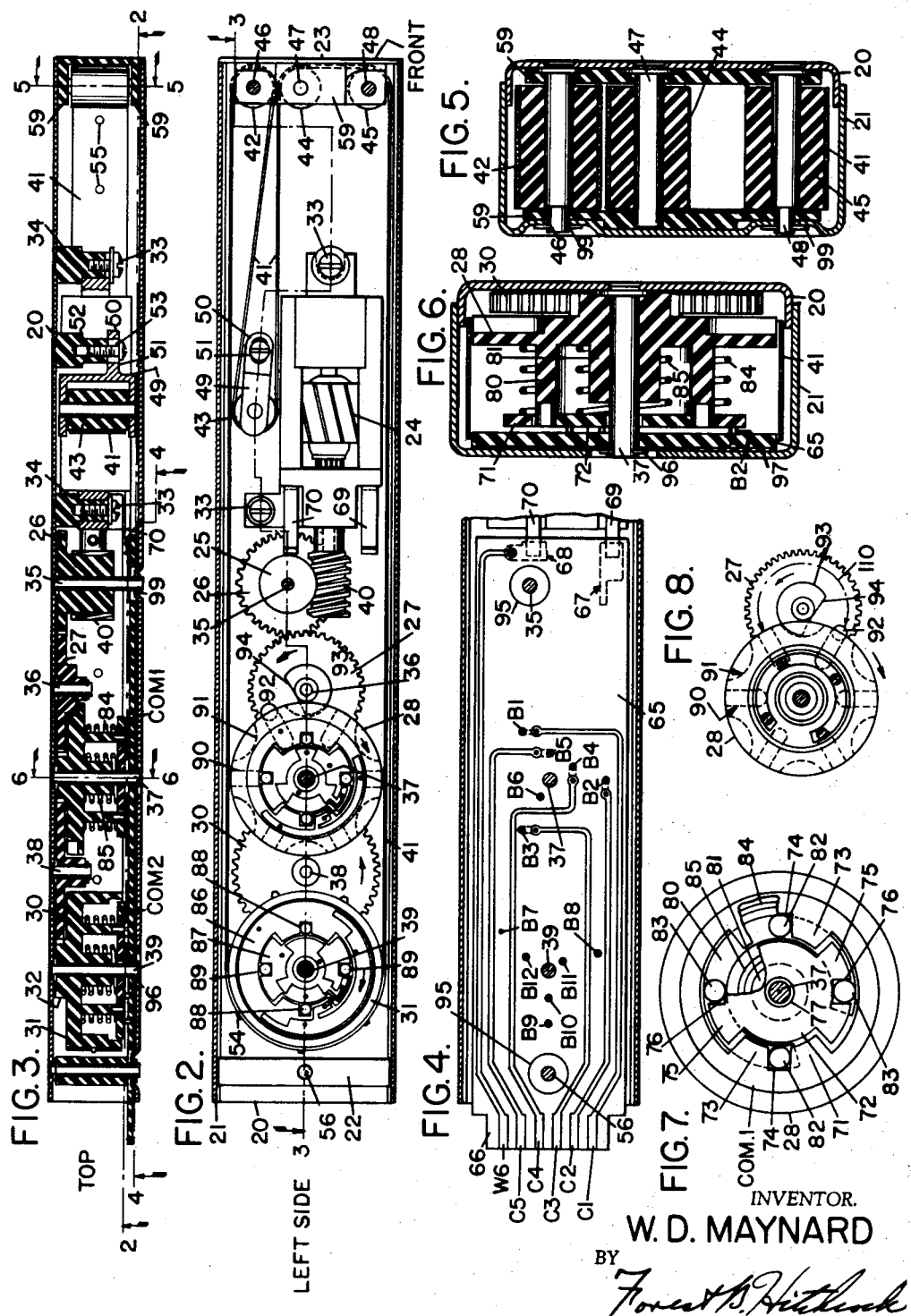

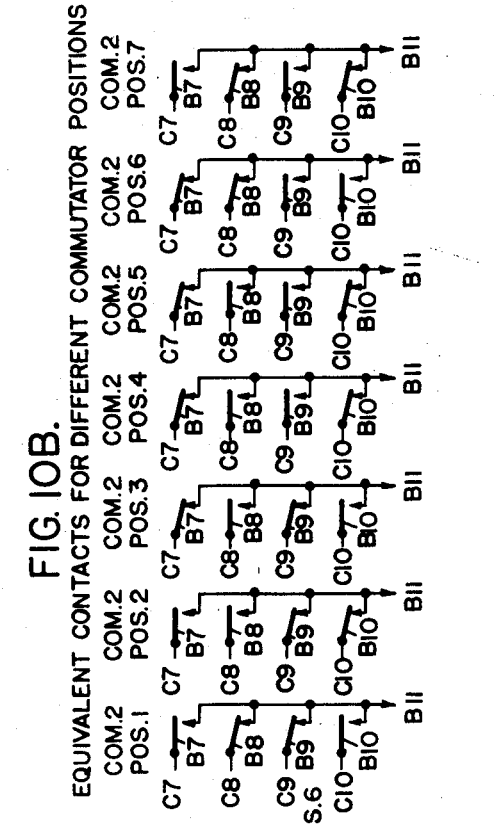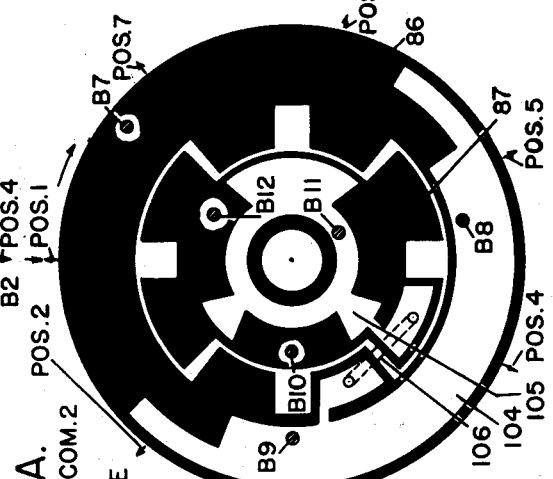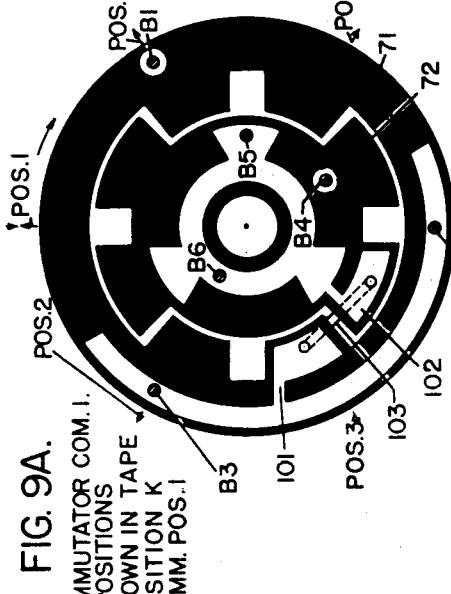

FIG. 11. TYPICAL CIRCUIT FOR 36 DIGIT INDICATOR
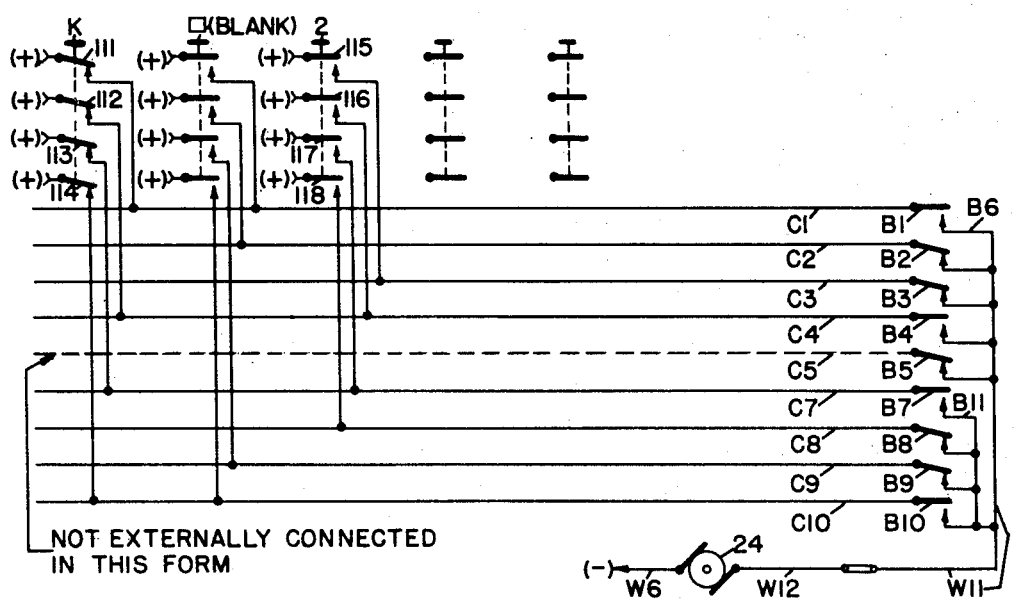
FIG. 12. TYPICAL CIRCUIT FOR 12 DIGIT INDICATOR
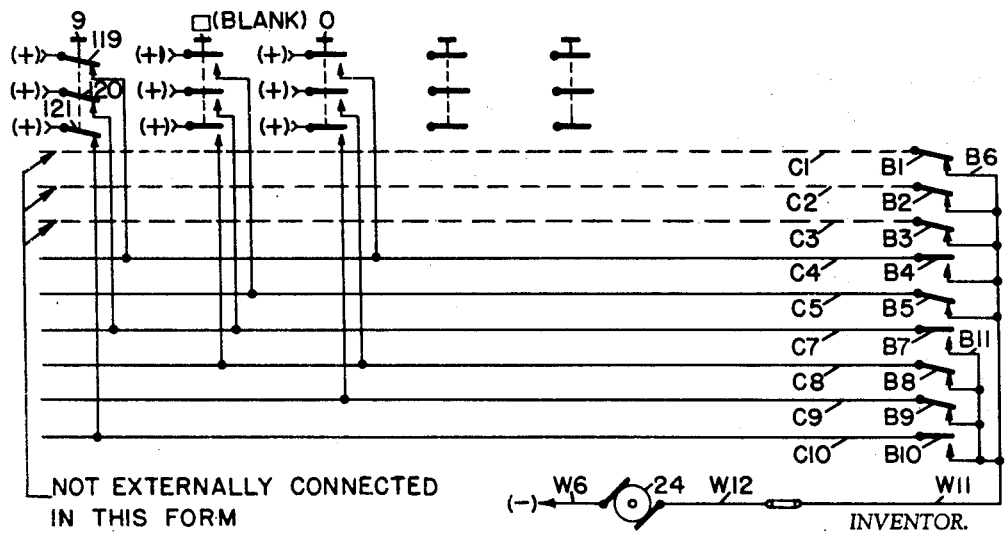

FIG. 13.

| TAPE POS. | C1 | C2 | C3 | C4 | C5 | C7 | C8 | C9 | C10 | | 36 POS. IND. | | 12 POS. IND. | |
|---|---|---|---|---|---|---|---|---|---|---|---|---|---|---|
| 1 | + | O | O | + | O | + | O | O | + |  | K |  | 9 |  |
| 2 | + | + | O | O | + | + | + | O | O |  | L |  | □ |  |
| 3 | O | + | O | + | O | O | + | O | + |  | M |  | N |  |
| 4 | O | + | + | O | + | O | + | + | O | X | H |  | 6 |  |
| 5 | O | O | + | + | O | O | + | + | O | X | N |  | O |  |
| 6 | + | O | + | O | + | O | O | + | + |  | P |  | 1 |  |
| 7 | + | O | O | + | O | + | O | + | O |  | Q |  | 2 |  |
| 8 | + | + | O | O | + | + | O | O | + |  | R |  | 3 |  |
| 9 | O | + | O | + | O | + | + | O | O |  | S |  | 4 |  |
| 10 | O | + | + | O | + | O | + | O | + |  | T |  | 5 |  |
| 11 | O | O | + | + | O | O | + | + | O | X | N | * | O | * |
| 12 | + | O | + | O | + | O | + | + | O | X | U |  | 6 | * |
| 13 | + | O | O | + | O | O | O | + | + |  | V |  | 7 |  |
| 14 | + | + | O | O | + | + | O | + | O |  | W |  | 8 |  |
| 15 | O | + | O | + | O | + | O | O | + |  | X |  | 9 |  |
| 16 | O | + | + | O | + | + | + | O | O |  | Y |  | □ |  |
| 17 | O | O | + | + | O | O | + | O | + |  | Z |  | N |  |
| 18 | + | O | + | O | + | O | + | + | O | X | U | * | 6 |  |
| 19 | + | O | O | + | O | O | + | + | O | X | 4 |  | O |  |
| 20 | + | + | O | O | + | O | O | + | + |  | □ |  | 1 |  |
| 21 | O | + | O | + | O | + | O | + | O |  | O |  | 2 |  |
| 22 | O | + | + | O | + | + | O | O | + |  | 1 |  | 3 |  |
| 23 | O | O | + | + | O | + | + | O | O |  | 2 |  | 4 |  |
| 24 | + | O | + | O | + | O | + | O | + |  | 3 |  | 5 |  |
| 25 | + | O | O | + | O | O | + | + | O | X | 4 | * | O | * |
| 26 | + | + | O | O | + | O | + | + | O | X | 5 | * | 6 | * |
| 27 | O | + | O | + | O | O | O | + | + |  | 6 |  | 7 |  |
| 28 | O | + | + | O | + | + | O | + | O |  | 7 |  | 8 |  |
| 29 | O | O | + | + | O | + | O | O | + |  | 8 |  | 9 |  |
| 30 | + | O | + | O | + | + | + | O | O |  | 9 |  | □ |  |
| 31 | + | O | O | + | O | O | + | O | + |  | A |  | N |  |
| 32 | + | + | O | O | + | O | + | + | O | X | 5 | * | 6 |  |
| 33 | O | + | O | + | O | O | + | + | O | X | B |  | O |  |
| 34 | O | + | + | O | + | O | O | + | + |  | C |  | 1 |  |
| 35 | O | O | + | + | O | + | O | + | O |  | D |  | 2 |  |
| 36 | + | O | + | O | + | + | O | O | + |  | E |  | 3 |  |
| 37 | + | O | O | + | O | + | + | O | O |  | F |  | 4 |  |
| 38 | + | + | O | O | + | O | + | O | + |  | G |  | 5 |  |
| 39 | O | + | O | + | O | O | + | + | O | X | B | * | O | * |
| 40 | O | + | + | O | + | O | + | + | O | X | H | * | 6 | * |
| 41 | O | O | + | + | O | O | O | + | + |  | I |  | 7 |  |
| 42 | + | O | + | O | + | + | O | + | O |  | J |  | 8 |  |

COM. 1 — COM. 2

36 DIGIT IND. CODES
12 DIGIT IND. CODES
X = DUPLICATED CODES
✶ = DUPLICATED TAPE CHARACTERS
← = CYCLIC REPEAT OF CODES

INVENTOR.
W. D. MAYNARD

United States Patent Office 3,142,053
Patented July 21, 1964

3,142,053
DATA POSTING INDICATOR HAVING PLURAL
CONCENTRIC DISC COMMUTATOR CONTROL
Wheeler D. Maynard, Mendon, N.Y., assignor to
General Signal Corporation
Filed Sept. 26, 1958, Ser. No. 763,569
1 Claim. (Cl. 340—324)

This invention relates in general to data posting indicators of the digital type wherein a movable tape displays an individual character on the front of the device in response to a selected code.

In code communication systems, such as used in connection with railway signaling, teletype, airway traffic control systems and the like, it is desirable to make use of posting indicators to display different characters or symbols which correspond to the codes being transmitted. Such a posting indicator must of necessity be very reliable, economical, adaptable to universal use and capable of functioning under varying conditions wherein temperature changes and atmospheric conditions effect the coefficient of expansion and contraction and the life of working parts. Furthermore, such a posting indicator must be able to function in any position of mounting.

In general, the posting indicator of the present invention contemplates a device which is small in overall size and particularly in cross section to facilitate mounting in rows and banks. The metal parts are made of non-rust and non-corrosive materials whereas the gears and such are made of plastic "Nylon," molded "Cycolac" or the like material for mechanical strength and dimensional stability. The commutators and the terminal board are of the printed circuit type wherein the wires and contacts are bonded on an insulation board material. The housing comprises two channel shaped members which forms both sides and top and bottom when fastened together. The front wall has a display window therein, whereas the back wall is of insulation material and is normally adapted to plug coupling. The display window and display characters are unusually large as compared with the overall size of the front plate.

More specifically, the posting indicator of the present invention provides that all of the working parts are mounted on metallic pivot pins which are anchored in one side wall so that the other side wall or cover plate may be easily removed. The printed circuit terminal board is mounted on the free ends of certain of the metallic pivot pins and is backed up by the removable side plate. A piece of insulating material is inserted therebetween to protect the printed circuits on the back side of the terminal board.

The working parts comprise a direct current permanent-magnet-field motor which drives a first commutator drum by means of a gear train and a "Geneva" cam movement to move the first commutator drum intermittently. A second gear train between the first commutator drum and a second commutator drum drives the second commutator drum at a different speed ratio, also intermittently. The second commutator drum intermittently drives the display tape which is suitably mounted on this second commutator drum as well as other rollers which are also mounted on the stationary side wall.

The front side of the printed circuit terminal board is provided with twelve contact brushes which protrude therefrom, six for each commutator. A unique feature of the commutator assembly lies in the fact that each commutator unit comprises two discs which are mounted one within the other concentrically on the same drum so that they rotate as one unit. Each disc is floated on its individual coil spring and bears against three of the contact brushes on the terminal board, thus providing a three point contact suspension for each disc. The coil spring provides the necessary bias and correct contact pressure between the stationary contact brushes and the contact segments on the rotating commutator discs. This construction also provides an assembly completely free of adjustment. A flexible wire connection between the contact segments on each disc permits having one common return brush for each commutator drum.

The back end of the printed circuit terminal board protrudes from the back end of the posting indicator unit and is provided with twelve contact pads, six on each side, arranged for plug coupling if desired. These twelve contact pads provide for connections to nine code wires and a common return, also two connections to the motor.

In the particular illustration of the invention shown on the drawings and herein described, there has been shown a posting indicator arranged for the display of thirty-six characters, the characters chosen being the alphabet and the ten number digits. In this thirty-six character form of posting indicator, only eight of the code wires are used and the ninth code wire is not connected. The application of energy to four of these eight code wires in certain selected combinations will operate the motor unit to a position wherein the code called for will be satisfied when the corresponding four commutator contact segments are open circuited, thus deenergizing the motor circuit and stopping the display tape with the corresponding code character displayed through the front cover plate.

Another particular feature of the present invention is that the posting indicator unit may be readily converted to a twelve digit display unit. In this version of the unit, the twelve selected display characters are repeated on the tape three times, the tape remaining the same length. For a twelve character display unit, only six of the nine code wires are used and the other three code wires are disconnected. The application of energy to three of these six code wires in certain selected combinations will operate the motor unit and the display tape to a position wherein the character called for is displayed.

Another feature of the present invention is apparent when considering the application of a drive by means of a "Geneva" cam escapement driven by a motor through a gearing means including a worm gear and a helical gear. The result is such that there is provided an intermittent drive for the commutators and display tape from one position to the next which is fast and postive and one in which the load is uniformly accelerated and decelerated with a minimum of wear and strain on the working parts. Also, there is quite a large dwell period between the movements of the "Geneva" cam providing positive latching between tape positions without the use of detents, latching relays and the like.

Other objects, purposes and characteristic features of the present invention will be apparent as the detailed description progresses with reference to the accompanying drawings. In the drawings, like reference characters refer to like parts in the various views, in which:

FIG. 2 is a side elevation view of the data posting indicator of the present invention as viewed with the front display wall to the right and with the removable housing wall broken away and the terminal board removed, substantially as indicated by the section line 2—2 of FIG. 3, as viewed in the direction of the arrows;

FIG. 3 is a top sectional view of the apparatus shown in FIG. 2 including the removable housing wall and the terminal board, substantially as indicated by the section line 3—3 of FIG. 2, as viewed in the direction of the arrows;

FIG. 4 is a back view of the terminal board as distinguished from the front view as shown in FIG. 1, and is shown directly below FIG. 2 in the position it would assume if assembled in its position in front of the apparatus shown in FIG. 2;

FIG. 5 is a cross sectional view of the data posting indicator of the present invention and shows the housing structure as well as the display tape guide rollers, substantially as indicated by the section line 5—5 of FIG. 3, as viewed in the direction of the arrows;

FIG. 6 is a cross sectional view of the data posting indicator of the present invention, substantially as indicated by the line 6—6 of FIG. 3, as viewed in the direction of the arrows;

FIG. 7 is an enlarged plan view partly broken away to show the commutator disc mounting and driving means, the contact segments on the commutator discs being removed for the sake of clearness so as to distinguish the outlines of the two separate discs;

FIG. 8 is a partial plan view of the "Geneva" cam movement and is shown to illustrate a position wherein the operating element has just completed a cam movement cycle as distinguished from its dwell position shown in FIG. 2;

FIG. 9A is an enlarged plan view of the first group of commutator discs which are related to the commutator drum associated with the "Geneva" cam and is shown in its No. 1 position which corresponds to tape character position K, and also shows the terminal board contact brushes associated therewith superimposed thereon.

FIG. 9B is a view showing the open and closed positions of the various commutator segments and contact brushes as simulated by open and closed contacts for the commutator of FIG. 9A in its No. 1 position as shown, and also the other five positions which it can assume;

FIG. 10A is an enlarged plan view of the second group of commutator discs which are related to the commutator drum associated with the display tape and is shown in its No. 1 position which corresponds to the tape position K, and also shows the terminal board contact brushes associated therewith superimposed thereon;

FIG. 10B is a view showing the open and closed positions of the various commutator segments and contact brushes as simulated by open and closed contacts for the commutator of FIG. 10A in its No. 1 position as shown, and also the other six positions which it can assume;

FIG. 11 is a typical circuit for operation of a 36 digit data posting indicator and is also shown as having called for and satisfied a code calling for tape display position K;

Figure 1:
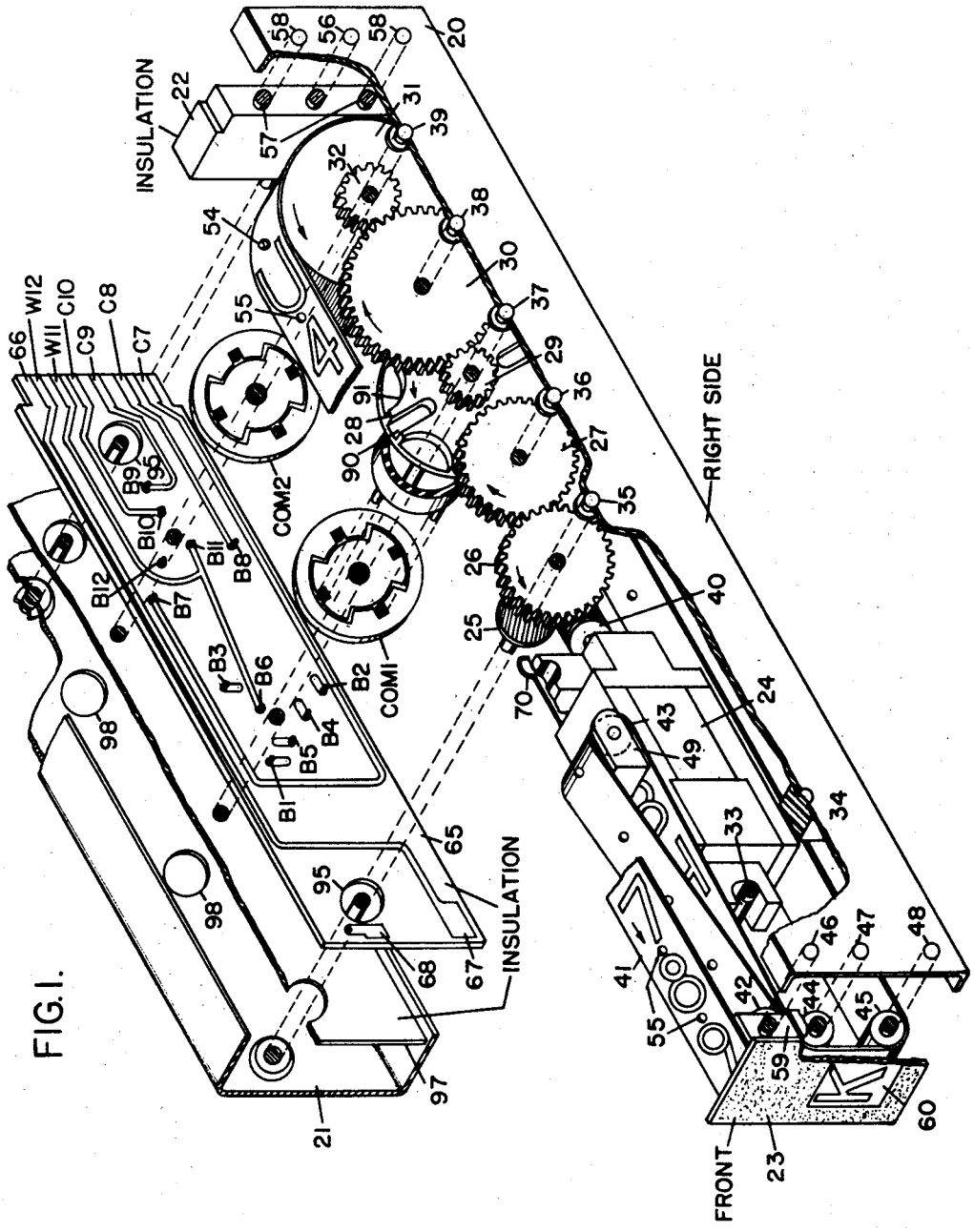
FIG. 1 is a diagrammatic exploded view of the data posting indicator of the present invention, the parts being shown in perspective and partly broken away to facilitate explanation and understanding of the disclosure, as viewed with the front display wall to the left and the display tape and other parts in a position wherein the character K is displayed.

FIG. 12 is a typical circuit for operation of a 12 digit data posting indicator and is shown as having called for and satisfied a code calling for the first tape display character, which in this case is character 9; and FIG. 13 is a chart showing the complete tape positions, tape characters and code wire combinations for all of the code and tape characters for both the thirty-six digit and twelve digit data posting indicator devices of the present invention.

Referring now to the detailed drawings and more particularly to the structural views comprising FIGS. 1 to 8 inclusive, the data posting indicator comprises a box-like structure having one supporting channel shaped metallic side wall 20 and another removable channel shaped metallic side wall 21, the top and bottom sections of the side wall 21 overlapping the top and bottom sections of the side wall 20 when assembled. A back plate 22 of insulating material fills in the back opening whereas a front plate 23 of glass, plastic or other transparent material covers the front opening.

The side wall 20 supports the entire working mechanism which comprises a small conventional D.C. permanent-magnet-field motor 24, a combination integral helical gear 25—gear wheel 26 unit, a drive gear 27, the combination "Geneva" cam 28—commutator COM1—gear wheel 29 unit, an idler gear 30, and the combination tape drum 31—commutator COM2—gear wheel 32 unit. The motor 24 is fastened to the side wall 20 by means of screws 33 and suitable mounting blocks 34 whereas the other above-mentioned parts are rotatably mounted on their respective pivot pins 35, 36, 37, 38 and 39. These pivot pins are staked and securely fastened at one end only to the side wall 20 so that they extend inwardly at right angles thereto. The motor shaft is provided with a worm 40 which meshes with the helical gear 25 to drive the mechanism above referred to.

The character display tape 41 is rotatably mounted within the housing on the tape drum 31 and a series of rollers 42, 43, 44 and 45. The rollers 42, 44 and 45 are pivotally mounted on their respective pivot pins 46, 47 and 48 which are also staked and fastened to the side wall 20 at one end only. The roller 43 is pivotally mounted in a U shaped bracket 49 which has an integral projecting lug 50. This lug 50 provides a one point suspension for the bracket and is fastened to the side wall 20 by means of a screw 51 and a suitable mounting block 52. This type of mounting permits the bracket 49 and its associated roller 43 to be moved about an arc from its mounting point and provides a take-up for any slack in the tape 41. The lug 50 is also provided with a slotted hole 53 therein so that further adjustment is available if needed. The tape drum 31 is provided with sprocket pins 54 which cooperate with holes 55 in the tape 41 to provide a means for driving the tape as will be explained in detail hereinafter.

The back plate 22 is mounted on a pin 56 which is also staked and fastened to the side wall 20 at one end only. Two studs 57 which protrude from the back wall 20 will enter the holes 58 in the side wall 20 when assembled to maintain proper alignment of the back plate 22. The front plate 23 is provided with flanges 59 which protrude into the housing. Holes are provided in these flanges 59 so that the pivot pins 46 and 48 which support the rollers 42 and 45 also pass through these holes in the flanges 59 and hold the front plate 23 in position.

The front plate 23 is preferably made of a clear plastic composition which is sand blasted, glazed or otherwise made opaque on its entire front surface except for a square space slightly larger than the size of the characters on the display tape. This square space 60 is kept clear and transparent and provides a so called window through which the tape characters are visible. The rollers 44 and 45 position the tape as close as possible to the back side of front plate 23 so that the tape characters may be viewed even from a wide angle.

Referring now to the printed circuit terminal board as shown more clearly in FIGS. 1 and 4, this terminal board 65 is made of insulation board and has printed wiring, contact pads and the like bonded thereto. One end 66 of this terminal board 65 is reduced in size and projects out of the housing at the back end to facilitate external wiring connections, which may be of the plug coupler type if desired. As shown in FIG. 1, the inside surface of this terminal board 65 is provided with twelve contact brushes, six for each commutator COM1 and COM2. The six contact brushes which cooperate with the commutator COM1 have been designated B1, B2, B3, B4, B5 and B6, whereas the six contact brushes which coperate with the commutator COM2 have been designated B7, B8, B9, B10, B11 and B12. As shown more clearly in the enlarged view FIG. 6, and particularly the contact brush B2 for example, these contact brushes protrude from the inside surface of the terminal board 65 and extend all the way through the terminal board 65, and some of them have metallic pad extensions which cooperate with printed circuits on the reverse side.

The inside surface of the terminal board 65 is also provided with two contact pads 67 and 68 which cooperate with respective spring biased contact springs 69 and 70 (see FIGS. 2, 3 and 4) which are located on the motor mounting block 34. These contact springs 69 and 70 in turn are connected to the brushes (not shown) of the motor 24.

Also provided on the inside surface of the terminal board 65 are printed circuits which terminate into contact pads on the end 66 of the terminal board 65 to facilitate external wiring. These contact pads and their associated printed circuits have been designated C7, C8, C9, C10, W11 and W12. The contact pads C7, C8, C9 and C10 are code receiving carriers and their associated printed circuits connect them to their respective contact brushes B7, B8, B9 and B10. The contact pad W11 and its associated printed circuit is the common return carrier for the code pulses and is connected to the contact brushes B11 and B6, one for each commutator. The contact pad W12 is connected to the contact pad 67 and carries the motor energy feed.

Similarly, the outside surface of the terminal board 65 is provided with six contact pads on its end portion 66. These contact pads and their associated printed circuits have been designated C1, C2, C3, C4, C5 and W6. The contact pads C1, C2, C3, C4 and C5 are code receiver carriers and are connected to their respective contact brushes B1, B2, B3, B4 and B5, whereas the contact pad W6 is connected to the contact pad 68 to provide a common return source for the motor circuit.

Referring now to the commutators COM1 and COM2 and their unique construction and supporting means, it is believed that a detailed description of the commutator COM1 will be sufficient as both are constructed alike, except for their contact arrangements. With reference to FIGS. 2, 3, 6 and 7, particularly the enlarged views of FIGS. 6 and 7, the commutator COM1 is shown mounted on the back of the "Geneva" cam drum 28, and primarily includes two flat discs 71 and 72 of insulation material which are positioned one within the other concentrically and on the same plane. For convenience, the metallic contact pads have been eliminated on FIG. 7 to more clearly show the outlines of the discs 71 and 72.

The outer disc 71 is provided with two diametrically opposite inwardly projecting portions 73 which each have a notch 74 therein located on a line through their centers. Likewise, the inner disc 72 is provided with two diametrically opposite outwardly projecting portions 75 which each have a notch 76 therein located on a line through their centers. Although these projecting portions on the two discs 71 and 72 interlock with each other, they do not touch each other and this structural detail has no effect on the concentric mounting arrangement. Likewise, the inner disc 72 has a clearance hole 77 therein so that it does not bear against the pivot pin 37 upon which the "Geneva" cam drum 28 is mounted. The notches 74 and 76 determine the concentric alignment of the two discs, as about to be explained.

The "Geneva" cam drum 28 has an outer hub or circular wall 80 and an inner hub 81 extending outwardly therefrom on its rear surface. The outer hub 80 has four circular pins or studs extending outwardly from its end surface and these pins are spaced ninety degrees apart. This outer hub 80 and its four associated pins are so spaced and sized that the flat commutator discs 71 and 72, when placed thereover, permits the projecting portions 73 and 75 to rest on the end surface of the hub 80 with the four pins extending through the four notches in the two discs 71 and 72. Thus, it can be seen that two of the pins designated 82 cooperate with the two notches 74 in the outer disc 71 whereas the other two pins designated 83 cooperate with the two notches 76 in the inner ring 72. This arrangement not only mounts the discs 71 and 72 concentrically on the "Geneva" cam drum 28, but the two pins 82 act as driving members for the commutator disc 71 whereas the two pins 83 act as driving members for the commutator disc 72.

When the commutator discs 71 and 72 and the "Geneva" cam drum 28 are in their assembled position as just described and shown in the enlarged view of FIG. 6, provision is made to bias the commutator discs 71 and 72 outward away from the back of the "Geneva" cam drum 28 so that the outer sides of the discs 71 and 72 which carry the contact segments will bear against their associated contact brushes B1 and B6 inclusive located on the terminal board 65 as previously described. A coil spring 84 surrounding the outer hub 80 and located between the outer disc 71 and the back of the cam drum 28 provides the necessary bias for the outer disc 71 whereas a coil spring 85 surrounding the inner hub 81 provides the necessary bias for the inner disc 72.

As previously mentioned, the terminal board 65 is provided with six contact brushes B1 to B6 inclusive for cooperation with the commutator COM1. It should now be noted, however, that the outer disc 71 in its biased position bears against only three brushes, namely, brushes B1, B2 and B3. Similarly, the inner disc 72 in its biased position bears against only three brushes, namely, brushes B4, B5 and B6. This is shown very distinctly in the explanatory view FIG. 9A wherein the brushes B1 to B6 inclusive are superimposed and shown in cross section on the contact segment side of the commutator discs 71 and 72.

From the above description and with reference to the drawings, it can be seen and understood that each disc of the double disc commutator COM1 is separately suspended, centered, driven and biased against its three respective contact brushes, the three point contact means providing even contact pressure at all times during its rotary movements. Furthermore, this type of assembly requires no adjustments and is uniform in mass production.

The structure of the commutator COM2 is similar to that above described in connection with the commutator COM1 and it is mounted on and driven by the tape drum 31 in a similar manner. In this assembly, the outer disc 86 and the inner disc 87 are centered and driven by the drive pins 88 and 89 located on the tape drum 31, as shown in FIGS. 2 and 3. Also, as indicated on the explanatory view FIG. 10A, the outer disc 86 bears against the contact brushes B7, B8 and B9 whereas the inner disc 87 bears against the contact brushes B10, B11 and B12.

Referring now to the "Geneva" cam arrangement employed herein to drive the character tape 41 intermittently from one character position to the next, the cam drum 28 is provided with six radial grooves 90 on its outside surface which are spaced sixty degrees apart and extend from its outside edge inwardly towards its center. In between these slots 90 there is also provided six arcuate shaped cam grooves 91. The drive gear 27 is provided with a protruding drive pin 92 and a partial cam hub 93 on its inside surface. In operation, the drive pin 92 cooperates at times with the grooves 90 in the cam drum 28, whereas the partial cam hub 93 cooperates at times with the arcuate shaped cam grooves 91.

With reference to FIGS. 2 and 8, it can be seen in FIG. 2 that with the drive gear 27 rotating in a counterclockwise direction as shown by the directional arrow, the drive pin 92 on the drive gear 27 is about to enter a groove 90 in the cam drum 28 and the effective part of the partial cam hub 93 in half way through the arcuate cam groove 91, with the cut-away portion 94 of the cam hub 93 approaching a position adjacent to the periphery of the cam drum 28. As the drive gear 27 continues to rotate, the drive pin 92 enters the groove 90 and rotates the cam drum 28 clockwise as shown by the directional arrow. Also, the effective part of the cam hub 93 moves out of its cooperating arcuate cam groove 91 so that its cut-away portion 94 faces against the periphery of the cam drum 28. This action permits both the drive gear 27 and the cam drum 28 to rotate to an operated position as shown in FIG. 8, wherein the cam drum 28 has rotated sixty degrees, the drive pin 92 is about to leave its cooperating groove 90 and the cam hub 93 has entered the following arcuate cam groove 91 to a half-way position.

Further rotation of the drive gear 27 now places the cam hub 93 entirely within the arcuate cam groove 91, thus stopping the rotation of the cam drum 28 as the drive pin 92 continues to rotate inactive until it reaches a point where it is about to enter the following groove 90. At this time the cam hub 93 will be in a position to leave its cooperating arcuate cam groove 91, thus positioning all parts again in the position shown in FIG. 2 wherein the device is ready for another cycle of operation. Thus, the net result is a sixty degree movement of the cam drum 28 for every complete revolution of the drive gear 27.

In assembly of the data posting indicator of the present invention, the various parts of the device are so marked and constructed that fast quantity production are easily facilitated. All the pivot pins and supporting pins may be first assembled to the one stationary metallic side wall 20. Next the front wall 23 and the back wall 22 and the motor and the various gears, cams, etc. are placed over their respective supporting and pivot pins. The character tape 41 may now be placed on its respective rollers 42, 43, 44 and 45 and its driving tape drum 31. Now the commutators COM1 and COM2 are assembled to their respective cam drum 28 and tape drum 31 as previously described.

The terminal board 65 is provided with two clearance holes 95 to provide clear passage for the pivot pin 35 and the supporting pin 56 as it is being mounted on the two pivot pins 37 and 39. Holes are provided in the terminal board 65 to permit the pivot pins 37 and 39 to pass therethrough, whereupon split spring washers 96 placed over the ends of the pivot pins 37 and 39, hold the terminal board in place, as shown in FIG. 3 and the enlarged view FIG. 6.

A strip of insulating material 97 is also placed over the pivot pins 37 and 39 and lies next to the printed circuits on the reverse side of the terminal board 65 to provide electrical short circuit protection when the other metallic side wall 21 is placed in its assembled position. This side wall 21 has clearance holes 98 therein to allow free passage of the pivot pins 37 and 39 which hold the terminal board 65 in place as just described. Mounting holes are provided in this side wall 21 to receive the various pins 46, 48, 35 and 56, over which the side wall 21 passes when mounted, to provide a four point supporting means. Split spring washers 99 are placed over the ends of the mounting pins to hold the side wall 21 in position, as shown in FIG. 3 and more clearly in the enlarged view FIG. 5.

Referring now to the mechanics of operation of the particular form of data posting indicator shown on the drawings, energization of the motor 24 by an applied code will cause the motor to run until the code is satisfied, as will be explained more in detail hereinafter. The motor 24 rotates its worm 40 which drives the cooperating helical gear 25-spur gear 26 combination. The spur gear 26 meshes with the drive gear 27, which by means of its drive pin 92, rotates the "Geneva" cam drum 28 one sixth of a revolution for every complete revolution of the drive gear 27, as previously explained. The cam drum 28, by means of its associated spur gear 29, drives an idler gear 30 which in turn meshes with the spur gear 32 to rotate the tape drum 31 in the same direction as the cam drum 28.

As mentioned above, a complete revolution of the drive gear 27 only rotates the cam drum 28 sixty degrees. It should also be noted, however, that the drive gear 27 does all of its driving through an arc of about one hundred and twenty degrees. The other two hundred and forty degrees of rotary movement, as indicated by the dot and dash line 110 in FIG. 8, is merely lost motion so far as movement of the cam drum is concerned, as this cam drum 28 is locked in its so called dwell position by means of the arcuate section of the cam hub 93 which is rotating through the arcuate cam groove 91 in the cam drum 28.

However, when the code has been satisfied and the motor 24 is deenergized, this two hundred and forty degrees of arcuate rotary movement of the drive gear 27 is sufficient to permit the motor to dissipate its kinetic energy and stop before the drive pin 92 of the drive gear 27 again comes into contact with the next cam drum groove 90. This kinetic energy is not too great as the motor 24 must drive the drive gear 27 through a worm and helical gear combination which in itself will quickly pull down the motor speed. Furthermore, in the event that the overrun of the motor 24 would carry the drive pin through the whole two hundred and forty arcuate degrees of free movement, as soon as the drive pin 92 contacted the cam drum groove 90 it would stop. This is true because the friction between the spring biased commutator drums and the contact brushes would be sufficient to act as a brake with no energy on the motor 24.

The gear ratio between the cam drum 28 and the tape drum 31 is six to seven so that the cam drum 28 and its associated commutator COM1 has six stop stations per revolution, whereas the tape drum 31 and its associated commutator COM2 has seven stop stations per revolution. Each station on the two drums represents the movement of one character on the tape. This means that the display tape 41 has forty-two positions (six times seven); but, for reasons later explained, six of these forty-two positions have characters which are duplicates of other characters so that only thirty-six different characters are used.

In FIGS. 9A and 10A of the drawings, there has been shown the commutators COM1 and COM2 in an enlarged size to more clearly show their actual contact segments and the location of their respective contact brushes when the commutators are in their No. 1 positions and the character tape is in its No. 1 position with the tape character K displayed in the window 60. The commutator discs, being of insulating material, have been shown in solid black whereas the metallic contact segments are clear, and the contact brushes have been shown in cross section.

With particular reference to FIG. 9A the metallic contact segment portion of the outer disc 71 has been designated 101 whereas the metallic contact segment portion of the inner disc 72 has been designated 102. A flexible wire 103 is connected to these segments 101 and 102 to provide an electrical connection therebetween. It can also be seen that the contact brush B6 is always in contact with contact segment 102 regardless of its position. This contact brush B6 is therefore connected to the common return wire W11 as shown in FIG. 1 and described previously. The other brushes B1 to B5 inclusive are connected to the code wires C1 to C5 respectively, as shown in FIG. 4.

Referring now to FIG. 9B, there has been shown an illustration of open and closed contact fingers to simulate the open and closed positions of the contact segments 101 and 102 and their respective contact brushes B1 to B6 in all six stop positions of the commutator COM1. For example, the commutator COM1 of FIG. 9A has been shown in its Pos. 1 and by reference to Pos. 1 in the table of FIG. 9B we find that the circuit from code wire C1 through the contact B1 is open to the common return brush B6. This is true because by referring again to FIG. 9A we see that contact brush B1 is resting on insulation and hence there is no closed circuit to contact brush B6. Similarly, in FIG. 9A contact brush B2 is resting on contact segment 101 thus establishing a circuit and we find that by observing contact B2 in Pos. 1, FIG. 9B that the circuit from code wire C2 through the contact B2 is closed to the common return brush B6. Thus, the open and closed contacts in the six columns in FIG. 9B simulate the open and closed circuits through the commutator COM1 in all six of its positions.

The illustrations in FIGS. 10A and 10B are for the commutator COM2 and are similar to those above described with a few exceptions. In this instance, the outer disc 86 is provided with a metallic contact segment 104, whereas the inner disc 87 is provided with a metallic contact segment 105. These segments naturally are of different shape and size to fit the particular conditions and are joined electrically by a flexible wire connection 106. Another difference is that only four code receiving contact brushes (B7, B8, B9 and B10) and one common return contact brush (B11) are needed for the present arrangement so that the contact brush B12 is merely a dummy and is not electrically connected. This brush B12 is necessary, however, as the inner commutator disc 87 needs a three point bearing surface the same as the other discs.

As previously mentioned, the data posting indicator of the present invention has a structure which is adaptable to provide thirty-six distinctive symbols or may be readily converted to display twelve distinctive symbols merely by changing the character tape and making use of the appropriate codes. However, it should be understood that the display tape 41 has forty-two tape positions for both the thirty-six digit display and the twelve digit display. In order to understand the reason for this, it is necessary to consider the codes employed and their relationships to the mechanical structure.

One purpose of the present invention is to provide a structural display indicator which can be positioned and which can have its position checked as shown and described in the application of N. B. Coley, U.S. Ser. No. 763,493, filed September 26, 1958, now Patent No. 3,054,995. Another purpose of the present invention is to provide control of the driving motor through contacts in combination which for any particular position will be open for the combination assigned to that position to deenergize the motor. Obviously, the indicator could not be driven out of that position unless other contacts were employed which are closed for such position and which will carry current for any other position called for; yet it is desired to use such closed contacts for checking purposes to determine that the indictor is in the proper position all as described in the above mentioned N. B. Coley application.

In order to accomplish the above purposes, it is necessary to use certain selected codes from a binary code table which always have the same number of the corresponding characters. For example, if the characters (+) and (0) are used to represent the units of the radix of the binary code and a four digit binary code is employed, then it is proposed that only those code combinations be selected for use which include two symbols (+) and two symbols (0). When such codes are selected for use, it is apparent that they have complementary portions, i.e. there are always two symbols (+) although they occur in different digit places; and similarly there are always two symbols (0) although they occur in different digit places.

It is well understood that the number of different binary code combinations obtainable for any given number of digits is equal to two raised to the power of the number of digits. For example, two digits give four combinations; three digits give eight combinations; four digits give sixteen combinations, and so forth. However, when codes are selected from a binary code on the above basis to provide complementary portions and to always have the same number of particular symbols, there is a limited number of codes that meet such requirements. For example, a three digit binary code has three such combinations; a four digit binary code has six such combinations; a five digit binary code has ten such combinations; a six binary code has twenty such combinations, and so forth.

Referring now to FIGS. 11 and 13, it will be observed that eight code wires are employed forming two different groups of four each. By employing the selection of codes on the above discussed principles, each group of code wires then has six combinations which can be employed making a total number of combinations for both groups of (6×6) or thirty-six combinations. Referring to FIG. 13, it will be observed that for the thirty-six digit display indicator, the code wires C1, C2, C3 and C4 form the first group, and the code wires C7, C8, C9 and C10 form the second group. However, these selected combinations of each group cannot be multiplied, so to speak, with regard to the combinations of the other group without being able to use each of the six combinations of the second group, for example, in combination with each of the six selected codes of the first group. This cannot be by a gear ratio of six to six; but is conveniently done by having a gear ratio of six to seven. Since there are only six usable different codes for the commutator COM2, one of the codes is duplicated to make the seventh. This means that thirty-six different distinctive combinations are provided, but there must be forty-two positions for the display tape. This makes six additional positions which have codes corresponding to six other positions and for this reason the tape must have duplicate characters or symbols for such duplicate code positions. The duplicate codes have been indicated in FIG. 13 by use of an adjacent (×); whereas, the duplicated tape characters have been indicated by the use of an asterisk (*). The different portions of the code table which are repetitional have been set off by small arrows.

When the twelve-digit indicator is used, a forty-two position tape is still employed but it is observed that the tape repeats the symbols three times, that is, each of three sections of the tape are identical, and each identical section of the tape has two symbols that are duplicates of the symbols for two other positions in that section of the tape. These duplicates have been indicated by the asterisk (*). For this indicator the code wires C4 and C5 comprise one group and the code wires C7, C8, C9 and C10 comprise the other group.

In brief, the structure of the display indicator of the present invention has provision for twelve external wire connections, nine of which have been allotted for use as code wires, and one of which has been allotted for use as a common return wire. Two of such connections are allotted for use for the control of the motor. Of the nine code wires, only eight are used for the thirty-six digit indicator; whereas, only six code wires are used for the twelve digit indicator. Furthermore, in connection with the thirty-six digit display indicator using eight code wires, only four of such code wires are energized at any one time for the purpose of operating the indicator to a desired position. Similarly, in connection with the twelve digit display indicator using six code wires, only three of such wires are energized at any one time for the purpose of operating the indicator to a desired position. The particular code wires used and combinations of energizations employed have been illustrated in FIG. 13.

Although one specific selection of codes has been made, it is to be understood that other selections of codes can be made in accordance with the same principles herein disclosed and their interrelation established by the appropriate selection of gear ratios together with suitable modifications of the commutator segments. For example, the present display indicator has provisions for nine code wires but because it is desired to use such indicator with a specific number of display characters, a lesser than the total number of code wires is employed. Should it be desired to employ all nine code wires, it is apparent that out of the group of five code wires for commutator COM1, ten codes can be selected. Since there are six codes selectable for use when four code wires are used in connection with commutator COM2 then the maximum number of combinations would be sixty; but to embody this would require a different selection of gear ratios and a different use of duplicate codes in connection with the commutators. It is not proposed to go into detail herein with regard to such modifications of the present invention. It is desired to point out that it is within the scope of the present invention that the principles of code selection as related to the commutators and the gear ratios can be expanded to other sizes of display indicators.

In the code table, FIG. 13, the (+) denotes an energized code wire; whereas, an (0) denotes a non-energized code wire. The table has been arranged in columns and groups of columns wherein the first column shows the forty-two tape positions as well as commutator stop positions. The next five columns designate the energized and deenergized condition of the five code wires C1 to C5 in their respective forty-two positions for the commutator COM1, but it should be understood that only code wires C1, C2, C3 and C4 are used for the thirty-six digit indicator and the code wires C4 and C5 for the twelve digit indicator. The commutator COM1, as previously stated, has six stop positions per revolution. Each revolution, or sixth stop position, has been indicated by an arrow and the chart plainly shows that the code markings (+ or 0) are repeated for each revolution. Similarly, the next four columns designate the energized and deenergized condition of the four code wires C7 to C10 associated with the commutator COM2. This commutator COM2 has seven stop positions per revolution, and the code markings (+ or 0) are the same for each revolution of the commutator.

The next column shows the tape characters for each position as used in connection with the thirty-six digit indicator. As previously mentioned, in this particular indicator, only thirty-six characters are used on the forty-two position tape so that the six characters mentioned above, as indicated by the asterisks, are duplicated. The last column shows the tape characters for each position as used in connection with a twelve digit indicator. In this instance, the tape is divided into three sections of fourteen spaces each as indicated by the arrows and two of the characters in each fourteen space section are duplicated, as indicated by the asterisks and the characters in each fourteen space section are the same.

With particular reference to a thirty-six digit indicator and FIGS. 11 and 13, the typical circuit as well as the indicator assembly shows that the character K code has been called for and satisfied. In the typical circuit FIG. 11, for simplicity of explanation, push buttons have been illustrated, each having four contacts to carry energy to the four particular code wires selected. It should be understood, however, that relay control systems and the like could be used to select the desired codes. As previously mentioned, in this instance only eight of the nine code wires are used and the code wire C5 is the one which is disconnected externally.

With the push button K depressed, its contacts 111, 112, 113 and 114 are supplying energy to their respective code wires C1, C4, C7 and C10, and thence to the contact brushes B1, B4, B7 and B10. However, as previously explained in connection with FIGS. 9A, 9B, and 10A, 10B, the indicator has responded to the code combination for character K and the character tape 41 and the commutators COM1 and COM2 have rotated to a position wherein the contact brushes B1, B4, B7 and B10 are open circuited and the tape character K is displayed. Since the code combination is satisfied, the motor 24 is deenergized.

Assuming now that the push button 2 is depressed and its contacts 115, 116, 117 and 118 are closed, energy will be fed to the code wires C3, C4, C7 and C8. Since commutator contacts B3 and B8 are closed, the motor is energized and starts the indicator towards its new position for displaying character 2. Due to the commutator contact arrangements in accordance with the codes selected, at least one of the respective contact brushes B3, B4, B7 or B8 will be in a closed circuit position and feed energy to the motor 24 by way of the contact brushes B6 or B11, wires W11 and W12 and through the motor field to the common return wire W6 until the indicator reaches the new position. In other words, the motor will now operate the mechanism until the code is satisfied, whereupon the contact brushes B3, B4, B7 and B8 will all be open circuited, thus stopping the motor 24 and the character tape 41 in its position No. 23 for positioning the character 2 in front of the display window 60.

This sequence of operation may be checked out by referring to the code chart FIG. 13 and the commutator contact position charts FIGS. 9B and 10B. With reference to FIG. 13 we find that tape character 2 is in the twenty-third position on the tape which calls for code wires C3, C4, C7 and C8 to be energized, as indicated by the (+) mark. This checks with FIG. 11 which shows that when the push button 2 is depressed, these same code wires C3, C4, C7 and C8 have energy applied thereto, as previously stated. Also, as previously stated, when the code is satisfied, contact brushes B3, B4, B7 and B8 will be open circuited, thus stopping the indicator at the character 2 position. It can now be seen again that with reference to the twenty-third position on the code chart that commutator COM1 is in its fifth stop position, whereas commutator COM2 is in its second stop position. Referring now to FIG. 9B, we find that contact brushes B3 and B4 are open circuits when commutator COM1 is in its fifth stop position; and with reference to FIG. 10B, we also find that contact brushes B7 and B8 are open circuited when commutator COM2 is in its stop position.

Similarly, with reference to the operation of a twelve digit indicator constructed in accordance with the present invention, the typical circuit of FIG. 12 illustrates that only six of the nine code wires are used, namely C4, C5, C7, C8, C9 and C10 as previously mentioned and indicated on the code chart FIG. 13. The other three code wires C1, C2 and C3 are disconnected (or omitted) externally. When the character 9, which corresponds to the tape positions one, fifteen and twenty-nine is called for, push button 9 is depressed and energy is fed to three of the code wires C4, C7 and C10 by means of the closed push button contacts 119, 120 and 121. Energy then is supplied to the motor 24 through at least one of the respective contact brushes B4, B7 or B10 to drive the mechanism to a code satisfied position wherein the contact brushes B4, B7 and B10 are all open circuited as shown in FIG. 12, thus stopping the indicator in its character 9 position.

It will also be observed that in the particular indicator illustrated, it was desired to have a blank position on the display tape, indicated thus (☐). As the letter O and the figure 0 are the same, one of the spaces was used for the blank position. Other combinations could be used if desired. Also, it should be obvious that different color combinations could be displayed on the tape if desired, or any other type of characters which may be desired. Also, other combinations of commutators and the number of stop positions of each could be used to devise a data posting indicator having other character capacities.

Having shown and described two embodiments of data posting indicators which the present invention can assume and the mode of operation and assembly of each, it should be understood that various adaptations and deviations could be made, all without departing from the spirit of the invention within the scope of the appending claims.

What I claim is:

A posting indicator comprising:

(a) a longitudinal housing, (b) a tape having indicia formed thereon extending in the form of a belt longitudinally throughout substantially the entire length of the housing, said tape having a longitudinal row of perforations formed therein, (c) a sprocket gear supporting said belt at one end of the housing having sprocket teeth on its periphery engaging the perforations in said tape, (d) a motor at the other end of said housing within said belt having a rotor shaft extending longitudinally relative to said longitudinal housing, (e) a train of gears for driving said sprocket gear, each gear having its axis normal to said motor shaft, (f) worm gearing means for driving said train of gears by said rotor shaft, (g) said train of gears including a Geneva mechanism having a laterally disposed operating pin on one gear which engages several radial slots successively in a Geneva gear, whereby said Geneva gear and said sprocket gear are both operated intermittently while the motor is driven at constant speed, (h) a printed circuit board extending longitudinally along one side of said housing carrying circuits and connections for governing the operation of said motor, said printed circuit board having secured therein a plurality of laterally projecting contact brushes, and (i) commutating means including at least one commutator disc eagaged with one side of said Geneva gear and at least one commutator disc engaged with one side of said sprocket gear, said commutator discs being movable axially relative to their associated gears and said commutating means including compression springs disposed between the discs and their associated gears for biasing the discs respectively against certain of said brushes respectively on said printed circuit board for controlling the energization of the motor, said commutator means having a plurality of said commutator discs associated with at least one of the gears, said plurality of discs being concentric and movable laterally relative to each other and relative to the associated gear and each of the concentric discs having its own associated compression spring for urging it against associated brushes on said printed circuit board.

References Cited in the file of this patent

UNITED STATES PATENTS

| | | |
|---|---|---|
| 1,856,092 | Ebeling | May 3, 1932 |
| 2,723,391 | Hailey | Nov. 8, 1955 |
| 2,731,632 | Field | Jan. 17, 1956 |
| 2,736,017 | Marlowe | Feb. 21, 1956 |
| 2,737,650 | Bush et al. | Mar. 6, 1956 |
| 2,752,093 | Bush | June 26, 1956 |
| 2,754,500 | Lazich | July 10, 1956 |
| 2,755,458 | Rooks | July 17, 1956 |
| 2,806,112 | Fried | Sept. 10, 1957 |
| 2,889,546 | Bell et al. | June 2, 1959 |
| 2,959,773 | Marsh | Nov. 8, 1960 |

FOREIGN PATENTS

| | | |
|---|---|---|
| 721,683 | Great Britain | Jan. 12, 1955 |